US012071299B2

(12) United States Patent
Garland et al.

(10) Patent No.: US 12,071,299 B2
(45) Date of Patent: Aug. 27, 2024

(54) WASTE BIN COVER SYSTEM

(71) Applicants: Jeff Garland, Ottawa (CA); Louella Burchat, Ottawa (CA)

(72) Inventors: Jeff Garland, Ottawa (CA); Louella Burchat, Ottawa (CA)

( * ) Notice: Subject to any disclaimer, the term of this patent is extended or adjusted under 35 U.S.C. 154(b) by 0 days.

(21) Appl. No.: 17/900,997

(22) Filed: Sep. 1, 2022

(65) Prior Publication Data

US 2024/0076124 A1 Mar. 7, 2024

(51) Int. Cl.
*B65F 1/14* (2006.01)
*B65F 1/16* (2006.01)

(52) U.S. Cl.
CPC .......... *B65F 1/1615* (2013.01); *B65F 1/1623* (2013.01)

(58) Field of Classification Search
CPC ...... B65F 1/1615; B65F 1/1623; B65D 65/00; B65D 65/02; B65D 81/3876; B65D 2313/02
USPC .................. 220/200, 730, 315; 150/154, 901
See application file for complete search history.

(56) References Cited

U.S. PATENT DOCUMENTS

| | | | | | |
|---|---|---|---|---|---|
| 2,917,094 | A * | 12/1959 | Sullivan | B62B 3/1436 150/166 |
| 4,811,767 | A | 3/1989 | Kessler | |
| 6,036,047 | A * | 3/2000 | Dobbie | F25D 3/08 150/901 |
| 6,276,164 | B1 * | 8/2001 | Santa Cruz | F25D 3/08 62/530 |
| 6,382,451 | B1 | 5/2002 | Di Filippo | |
| 7,931,038 | B2 | 4/2011 | Jesus | |
| 8,376,170 | B1 | 2/2013 | Lobdell | |
| 9,688,470 | B2 | 6/2017 | Kirby | |
| 10,035,630 | B1 * | 7/2018 | Bell | B65D 51/24 |
| 10,285,395 | B1 | 5/2019 | Ehrenberg | |
| D861,275 | S | 9/2019 | Jordan, Jr. | |
| 2003/0226846 | A1 | 12/2003 | Horwath | |

FOREIGN PATENT DOCUMENTS

CA 2867606 4/2015

* cited by examiner

*Primary Examiner* — Nathan J Jenness
*Assistant Examiner* — Elizabeth J Volz

(57) ABSTRACT

A waste bin cover system for protecting a waste bin from interference from freezing water includes a waste bin with a lid for opening and closing an aperture at a top end of the bin. A cover is deployable over the lid and a rim of the waste bin when the lid is closed to protect the waste bin from interference from freezing water. The cover has a pair of flaps in front which are removably couplable to each other to secure the cover to the waste bin.

13 Claims, 5 Drawing Sheets

WASTE BIN COVER SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to waste bin covers and more particularly pertains to a new waste bin cover for protecting a waste bin from interference from freezing water.

(2) Description of Related Art Including Information Disclosed Under 37 CFR 1.97 and 1.98

The prior art relates to waste bin covers, including several which use flexible fabric such as a tarpaulin to cover a waste bin. However, the prior art does not disclose a flexible, water-impermeable cover for a waste bin which has a pair of flaps which may be secured together in front of the waste bin to secure the cover to the waste bin and which may be moved away from the waste bin to access and partially open a lid to the waste bin without removing the cover from the waste bin completely.

BRIEF SUMMARY OF THE INVENTION

An embodiment of the disclosure meets the needs presented above by generally comprising a waste bin having a rim at a top end of the waste bin defining an aperture and a lid for opening and closing the aperture. The waste bin has a front side adjacent the rim and a back side opposite the front side. The waste bin has a pair of opposing lateral sides extending between the front side and the back side.

A cover is constructed of a flexible, water impermeable material and is securable in a deployed position such that the cover surrounds the lid and the rim of the waste bin, wherein the lid is closed in the deployed configuration. The cover comprises a top sheet being arcuate and defining a cavity for receiving the lid and the rim therethrough. A belt strap is coupled to a bottom edge of the top sheet and wraps around the back side and the pair of opposing lateral sides of the waste bin when in the deployed configuration. A pair of belt flaps is coupled to and extends from a pair of ends of said belt strap. The pair of belt flaps is positionable on the front side of the waste bin and removably securable together such that the cover is secured to the waste bin.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
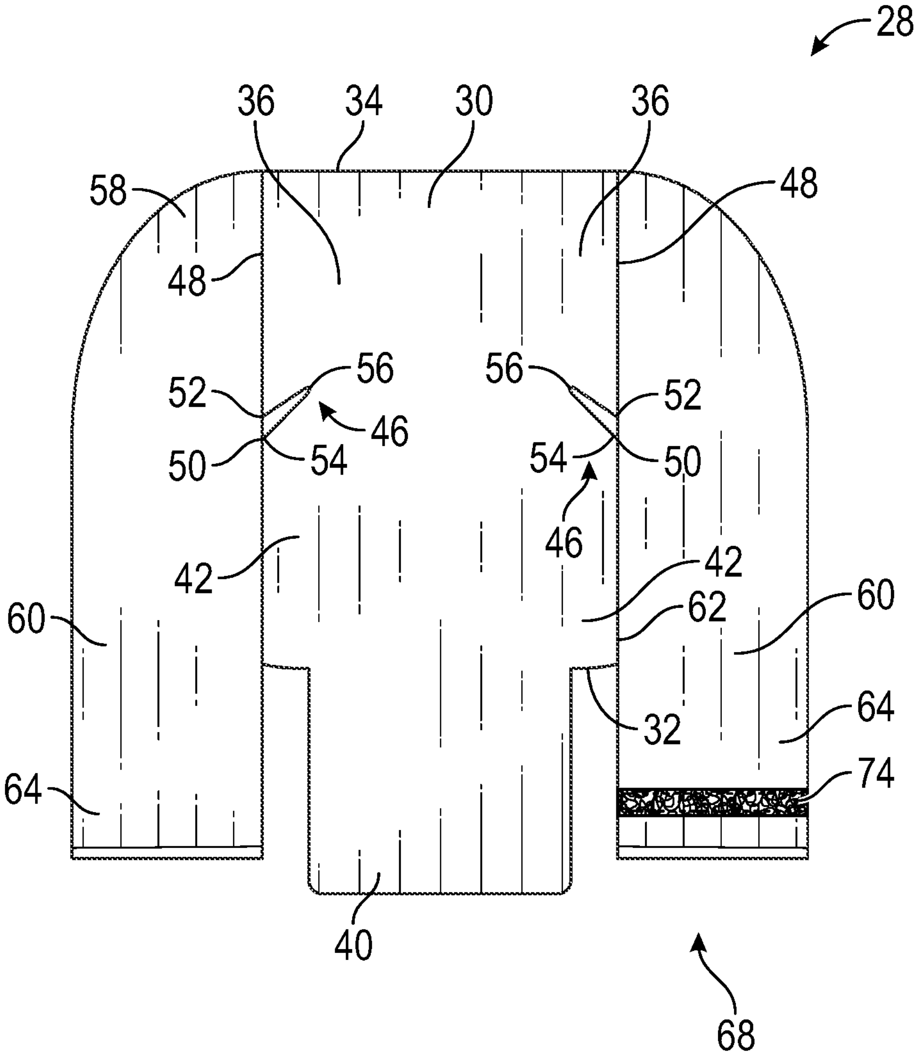
FIG. 1 is a top view of a waste bin cover in a flattened configuration of a waste bin cover system according to an embodiment of the disclosure.
Figure 2:
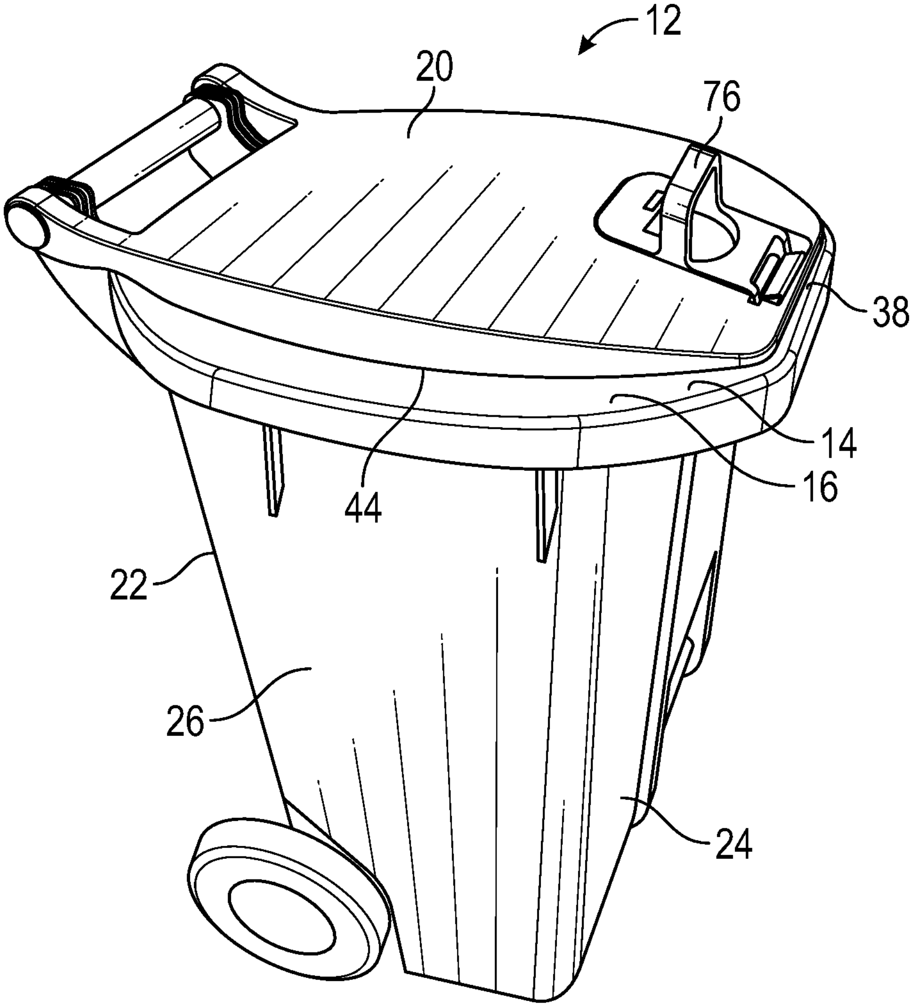
FIG. 2 is an isometric view of a waste bin of an embodiment of the disclosure.
Figure 3:
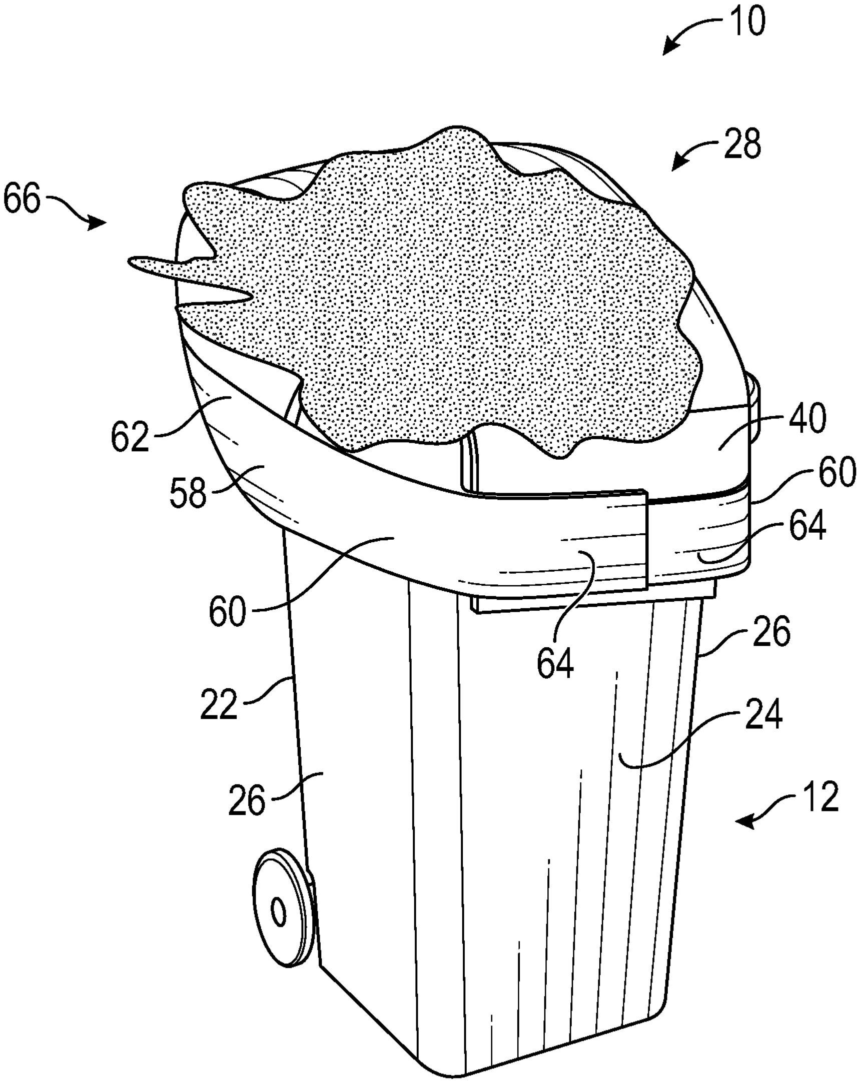
FIG. 3 is a perspective in-use view of an embodiment of the disclosure.
Figure 4:
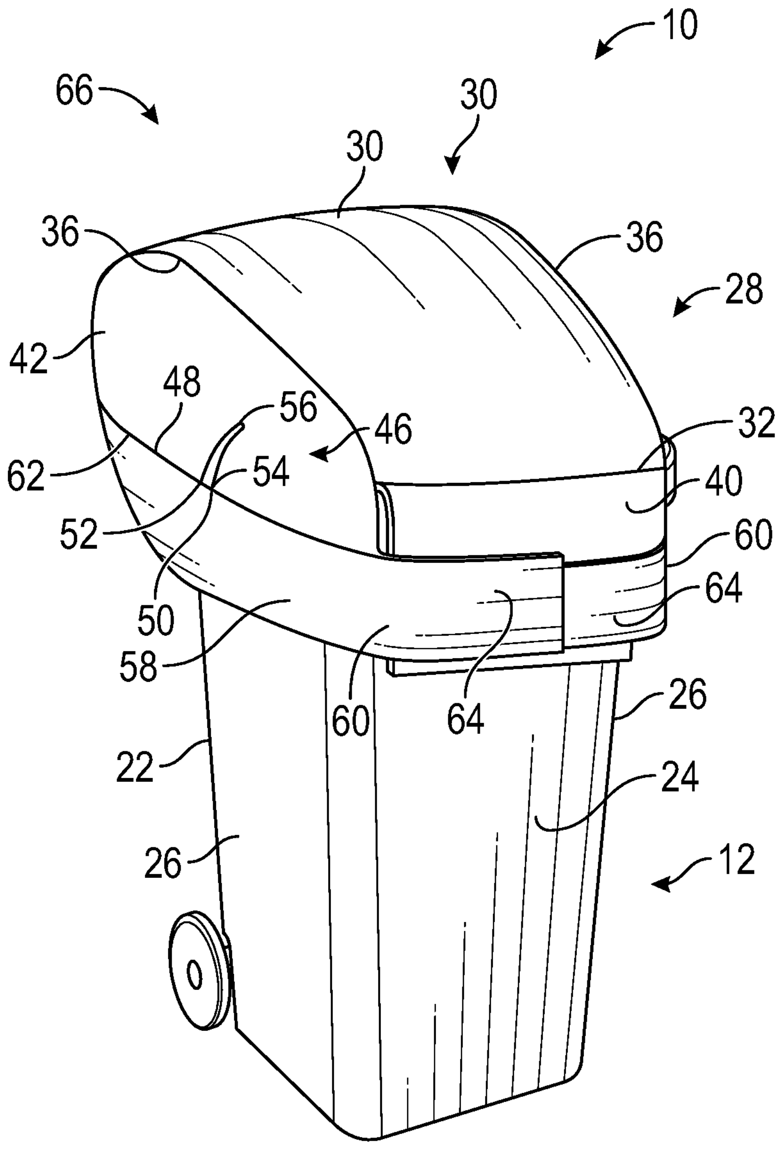
FIG. 4 is a perspective in-use view of an embodiment of the disclosure.
Figure 5:
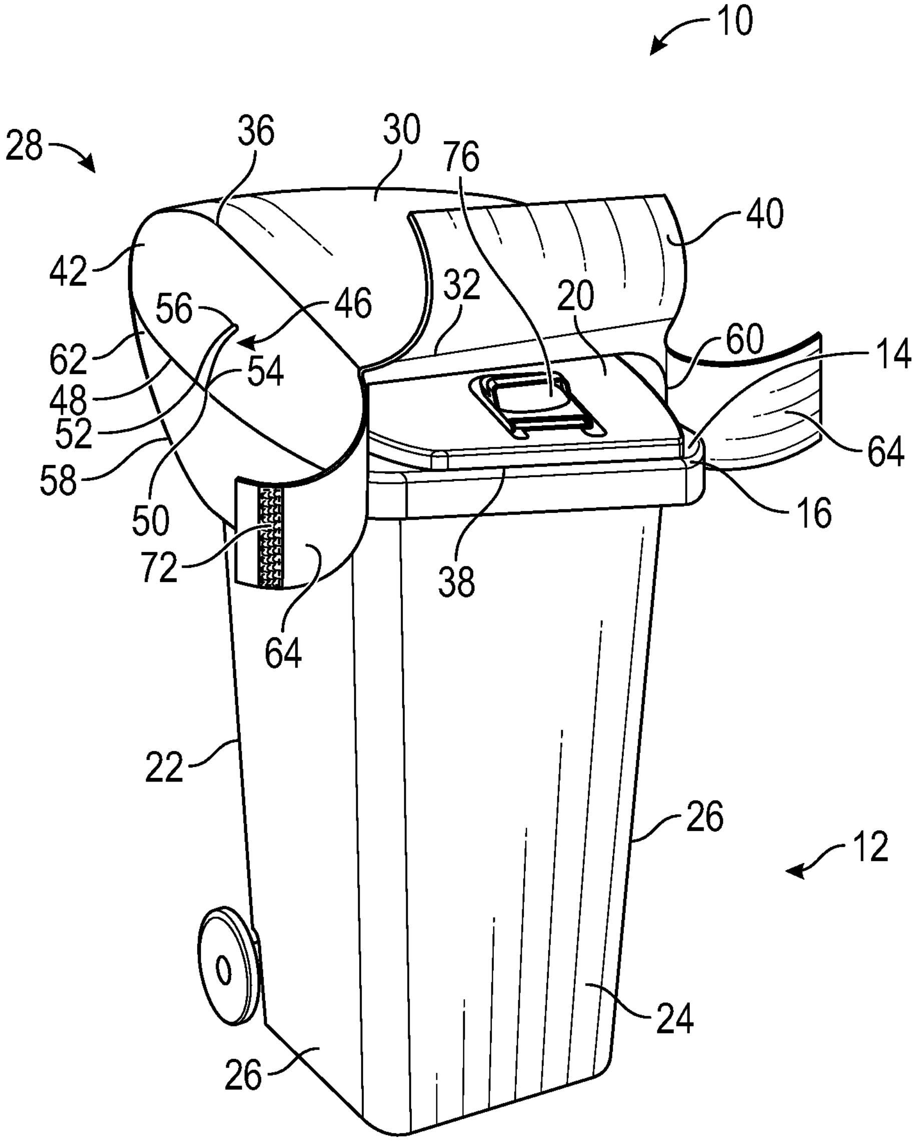
FIG. 5 is a perspective in-use view of an embodiment of the disclosure.

With reference now to the drawings, and in particular to FIGS. 1 through 5 thereof, a new waste bin cover embodying the principles and concepts of an embodiment of the disclosure and generally designated by the reference numeral 10 will be described.

As best illustrated in FIGS. 1 through 5, the waste bin cover system 10 generally comprises a waste bin 12 having a rim 14 at a top end 16 of the waste bin 12 defining an aperture and a lid 20 pivotably coupled at the top end 16 of the waste bin 12 and at a back side 22 of the waste bin 12 for opening and closing the aperture. The waste bin 12 is widest at the rim 14, has a front side 24 opposite the back side 22, and has a pair of opposing lateral sides 26 extending between the front side 24 and the back side 22. In this detailed description and the claims, the waste bin 12 is a bin for containing waste, which includes items to intended to be recycled or reused. A cover 28 is constructed of a flexible, water impermeable material, which may be a plastic such as polyethylene, nylon, or vinyl or the like. The cover 28 is securable in a deployed position such that the cover 28 surrounds the lid 20 and the rim 14 of the waste bin 12, wherein the lid 20 is closed in the deployed configuration 66. The cover 28 comprises a lid panel 30, a lid flap 40, a pair of rim panels 42, a belt strap 58, a pair of belt flaps 64, and a hook-and-loop fastener.

The lid panel 30 has a front end 32 and a back end 34 and a pair of lateral side edges 36 extending between the front end 32 and the back end 34. The lid panel 30 is positioned atop the lid 20 when in the deployed configuration 66, wherein the lid panel 30 extends downward from the lid 20 along the back side 22 of the waste bin 12 such that the back end 34 of the lid panel 30 is positioned adjacent the back side 22 and the front end 32 is positioned proximate a front portion 38 of the rim 14. The lid flap 40 is coupled to and extends from the front end 32 of the lid panel 30 and extends downward from the lid 20 along the front side 24 of the waste bin 12 when in the deployed configuration 66.

Each rim panel 42 is coupled to each of the lateral side edges 36 of the lid panel 30, covering a pair of lateral portions 44 of the rim 14 and extending between the front side 24 and the back side 22 of the waste bin 12 when in the deployed configuration 66. Each rim panel 42 forms a pleat 46 wherein a first portion 50 of a bottom edge 48 of the rim panel 42 is folded over a second portion 52 of the bottom edge 48 and coupled to a third portion 54 of the bottom edge 48. The pleat 46 is partially unfoldable at a top end 56 of the pleat 46 such that the lid 20 fits between the pair of rim panels 42 when the bottom edge 48 of each rim panel 42 abuts a respective opposing lateral side 26 of the waste bin 12.

The belt strap 58 has a pair of ends 60 and a top edge 62 extending between the pair of ends 60. The belt strap 58 is coupled to each rim panel 42 and the back end 34 of the lid panel 30 along the top edge 62 and wraps around the back side 22 and the pair of opposing lateral sides 26 of the waste bin 12 when in the deployed configuration 66. Each belt flap 64 is coupled to and extends from an associated end 60 of the pair of ends 60 of the belt strap 58. The pair of belt flaps 64 is positioned adjacent the lid flap 40 when in the deployed configuration 66 such that the lid flap 40 is positioned between the pair of belt flaps 64 and the front side 24 of the waste bin 12, one of the pair of belt flaps 64 overlapping another of the pair of belt flaps 64 in the deployed configuration 66.

The hook-and-loop fastener comprises a hook portion 72 and a loop portion 74 removably couplable to the hook portion 72. Each of the hook portion 72 and the loop portion 74 is coupled to an associated one of the pair of belt flaps 64 such that the one belt flap 64 is removably couplable to another belt flap 64 of said pair of belt flaps 64, thereby securing the lid flap 40 between the pair of belt flaps 64 and the waste bin 12 and securing the cover 28 to the waste bin 12 in the deployed configuration 66. The cover 28 may have a snap fastener, a drawstring, or like fastener instead of the hook-and-loop fastener to secure the pair of belt flaps 64 together and the cover 28 to the waste bin 12. The snap fastener would have a female portion and a male portion for inserting into the female portion, each of the female portion and the male portion being attached to an associated belt flap 64. The drawstring would be insertable through each belt flap 64 such that it can be tied to secure the pair of belt flaps 64 together.

The cover 28 is also positionable in a flattened configuration 68 wherein each belt flap 64 and the lid flap 40 extend in a same direction from the belt strap 58 and the front end 32 of the lid panel 30 respectively.

In use, the cover 28 is placed onto the waste bin 12 to protect it from weather elements. When the cover 28 is positioned in the deployed configuration 66, water will not penetrate the cover 28 and freeze, causing the lid 20 to stick to the rim 14. The waste bin 12 may have a lid latching mechanism 76 on or near the lid 20 which will also be protected from freezing water that may incapacitate the lid latching mechanism 76. The pair of belt flaps 64 may be moved away from each other and the lid flap 40 lifted to access the lid 20 of the waste bin 12 without completely removing the cover 28 from off the lid 20, facilitating opening the lid 20 at least partially so that a waste item may be placed into the waste bin 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A waste bin cover system comprising:

a waste bin having a rim at a top end of said waste bin defining an aperture and a lid pivotably coupled at said top end of said waste bin and at a back side of said waste bin for opening and closing said aperture, said waste bin having a front side opposite said back side, said waste bin having a pair of opposing lateral sides extending between said front side and said back side; and a cover being constructed of a flexible, water impermeable material, said cover being securable in a deployed position such that said cover surrounds said lid and said rim of said waste bin, said lid being closed in said deployed configuration, said cover comprising:

a top sheet being arcuate and defining a cavity, said top sheet receiving said lid and said rim into said cavity when in said deployed configuration, said top sheet having a bottom edge wrapping around said back side and said pair of opposing lateral sides when in said deployed configuration;

a belt strap having a pair of ends and a top edge extending between said pair of ends, said belt strap being coupled to said bottom edge of said top sheet along said top edge, said belt strap wrapping around said back side and said pair of opposing lateral sides of said waste bin when in said deployed configuration; and a pair of belt flaps, each said belt flap being coupled to and extending from an associated end of said pair of ends of said belt strap, one of said pair of belt flaps being removably couplable to another of said pair of belt flaps on said front side of said waste bin when in said deployed configuration, said pair of belt flaps securing said cover to said waste bin in said deployed configuration when said one belt flap is coupled to said another belt flap of said pair of belt flaps, said pair of belt flaps facilitating access to said lid at said front side of said waste bin when said belt flaps are decoupled from each other.

2. The device of claim 1, further comprising said top sheet comprising:

a top panel having a front end and a back end, said lid panel having a pair of lateral side edges extending between said front end and said back end, said lid panel extending downward from said lid along said back side of said waste bin when in said deployed configuration such that said back end of said lid panel is positioned adjacent said back side, said front end being positioned proximate a front portion of said rim when in said deployed configuration; and a pair of rim panels, each rim panel being coupled to each of said lateral side edges of said lid panel, each rim panel covering a pair of lateral portions of said rim and extending between said front side and said back side of said waste bin when in said deployed configuration.

3. The device of claim 2, further comprising each said rim panel forming a pleat wherein a first portion of a bottom edge of said rim panel is folded over a second portion of said bottom edge and coupled to a third portion of said bottom edge, said pleat being partially unfoldable at a top end of said pleat such that said lid fits between said pair of rim panels when said bottom edge of each rim panel abuts a respective opposing lateral side of said waste bin.

4. The device of claim 1, further comprising a lid flap being coupled to and extending from said front portion of said bottom edge of said top sheet, said lid flap extending downward from said lid along said front side of said waste bin when in said deployed configuration, said pair of belt flaps being positioned adjacent said lid flap when in said deployed configuration such that said lid flap is positioned between said pair of belt flaps and said front side of said waste bin, said lid flap facilitating access to said lid at said front side of said waste bin when said lid flap is raised away from said front side of said waste bin.

5. The device of claim 1, further comprising one of said pair of belt flaps overlapping another of said pair of belt flaps in said deployed configuration.

6. The device of claim 5, further comprising a hook-and-loop fastener comprising a hook portion and a loop portion removably couplable to said hook portion, each of said hook portion and said loop portion being coupled to an associated one of said pair of belt flaps such that said one belt flap is removably couplable to another belt flap of said pair of belt flaps, thereby securing said lid flap between said pair of belt flaps and said waste bin and securing said cover to said waste bin in said deployed configuration.

7. The device of claim 5, further comprising a snap fastener comprising a female portion and a male portion removably insertable to said female portion, each of said female portion and said male portion being coupled to an associated one of said pair of belt flaps such that said one belt flap is removably couplable to another belt flap of said pair of belt flaps, thereby securing said lid flap between said pair of belt flaps and said waste bin and securing said cover to said waste bin in said deployed configuration.

8. The device of claim 1, further comprising a drawstring, said drawstring being capable of inserting through said pair of belt flaps and tying to secure said cover to said waste bin in said deployed configuration.

9. The device of claim 1, further comprising said cover being constructed of plastic.

10. The device of claim 1, further comprising said cover being constructed of polyethylene.

11. The device of claim 1, further comprising said cover being constructed of nylon.

12. The device of claim 1, further comprising said cover being constructed of vinyl.

13. A waste bin cover system comprising:

a waste bin having a rim at a top end of said waste bin defining an aperture and a lid pivotably coupled at said top end of said waste bin and at a back side of said waste bin for opening and closing said aperture, said waste bin being widest at said rim, said waste bin having a front side opposite said back side and a pair of opposing lateral sides extending between said front side and said back side; and a cover being constructed of a flexible, water impermeable material, said cover being securable in a deployed position such that said cover surrounds said lid and said rim of said waste bin, said lid being closed in said deployed configuration, said cover comprising:

a lid panel having a front end and a back end, said lid panel having a pair of lateral side edges extending between said front end and said back end, said lid panel being positioned atop said lid when in said deployed configuration, said lid panel extending downward from said lid along said back side of said waste bin when in said deployed configuration such that said back end of said lid panel is positioned adjacent said back side, said front end being positioned proximate a front portion of said rim when in said deployed configuration;

a lid flap being coupled to and extending from said front end of said lid panel, said lid flap extending downward from said lid along said front side of said waste bin when in said deployed configuration, said lid flap facilitating access to said lid at said front side of said waste bin when said lid flap is raised away from said front side of said waste bin;

a pair of rim panels, each rim panel being coupled to each of said lateral side edges of said lid panel, each rim panel covering a pair of lateral portions of said rim and extending between said front side and said back side of said waste bin when in said deployed configuration, each said rim panel forming a pleat wherein a first portion of a bottom edge of said rim panel is folded over a second portion of said bottom edge and coupled to a third portion of said bottom edge, said pleat being partially unfoldable at a top end of said pleat such that said lid fits between said pair of rim panels when said bottom edge of each rim panel abuts a respective opposing lateral side of said waste bin;

a belt strap having a pair of ends and a top edge extending between said pair of ends, said belt strap being coupled to each said rim panel and said back end of said lid panel along said top edge, said belt strap wrapping around said back side and said pair of opposing lateral sides of said waste bin when in said deployed configuration;

a pair of belt flaps, each said belt flap being coupled to and extending from an associated end of said pair of ends of said belt strap, said pair of belt flaps being positioned adjacent said lid flap when in said deployed configuration such that said lid flap is positioned between said pair of belt flaps and said front side of said waste bin, one of said pair of belt flaps overlapping another of said pair of belt flaps in said deployed configuration, said pair of belt flaps facilitating access to said lid at said front side of said waste bin when said belt flaps are decoupled from each other;

said cover being positionable in a flattened configuration wherein each said belt flap and said lid flap extend in a same direction from said belt strap and said front end of said lid panel respectively; and a hook-and-loop fastener comprising a hook portion and a loop portion removably couplable to said hook portion, each of said hook portion and said loop portion being coupled to an associated one of said pair of belt flaps such that said one belt flap is removably couplable to another belt flap of said pair of belt flaps, thereby securing said lid flap between said pair of belt flaps and said waste bin and securing said cover to said waste bin in said deployed configuration.

* * * * *